(12) United States Patent
Zhao et al.

(10) Patent No.: US 11,908,349 B2
(45) Date of Patent: Feb. 20, 2024

(54) DISPLAY PANEL AND FLEXIBLE DISPLAY DEVICE

(71) Applicant: Wuhan China Star Optoelectronics Semiconductor Display Technology Co., Ltd., Wuhan (CN)

(72) Inventors: Yong Zhao, Wuhan (CN); Wen Han, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 905 days.

(21) Appl. No.: 16/959,146

(22) PCT Filed: May 27, 2020

(86) PCT No.: PCT/CN2020/092480
§ 371 (c)(1),
(2) Date: Jun. 30, 2020

(87) PCT Pub. No.: WO2021/196380
PCT Pub. Date: Oct. 7, 2021

(65) Prior Publication Data
US 2023/0154360 A1   May 18, 2023

(30) Foreign Application Priority Data
Apr. 2, 2020   (CN) .......................... 202010254019.4

(51) Int. Cl.
*G09G 3/20* (2006.01)
*G09F 9/30* (2006.01)
*G06F 3/041* (2006.01)

(52) U.S. Cl.
CPC ............ *G09F 9/301* (2013.01); *G06F 3/0412* (2013.01)

(58) Field of Classification Search
CPC .... G09F 9/301; G09F 2380/02; G06F 3/0412; G09G 3/035; H10K 77/111
See application file for complete search history.

(56) References Cited

U.S. PATENT DOCUMENTS

| | | | | |
|---|---|---|---|---|
| 9,203,050 | B2* | 12/2015 | Jeong | H10K 59/12 |
| 10,522,783 | B2* | 12/2019 | Jo | H10K 50/844 |
| 10,732,674 | B2* | 8/2020 | Lee | H10K 50/868 |
| 10,930,883 | B2* | 2/2021 | Park | G06F 1/203 |

(Continued)

FOREIGN PATENT DOCUMENTS

| | | |
|---|---|---|
| CN | 102916034 | 2/2013 |
| CN | 206076240 | 4/2017 |

(Continued)

*Primary Examiner* — Joe H Cheng
(74) *Attorney, Agent, or Firm* — PV IP PC; Wei Te Chung; Zhigang Ma (57) ABSTRACT

A display panel and a flexible display device are provided. The display panel includes a substrate, a first adhesive layer, a display layer, and a protective layer. The display layer includes an array layer and a light-emitting device layer. The array layer is disposed directly on the first adhesive layer, and a grid structure is disposed on the substrate. Neither a backplane nor a pressure-sensitive adhesive layer is disposed on the display panel, which allows effectively manufacture a thin display panel, reduces the film layers of the panel, and improves the flexibility of the display panel.

17 Claims, 4 Drawing Sheets

(56) References Cited

U.S. PATENT DOCUMENTS

| | | | |
|---|---|---|---|
| 11,176,851 B2* | 11/2021 | Wang | H10K 77/111 |
| 11,245,782 B2* | 2/2022 | Hong | G06F 1/203 |
| 11,513,560 B2* | 11/2022 | Dong | B32B 9/04 |
| 2013/0032830 A1 | 2/2013 | Lee et al. | |
| 2015/0024170 A1* | 1/2015 | Min | H10K 77/111 |
| | | | 428/172 |
| 2016/0343964 A1 | 11/2016 | Kwon | |
| 2019/0165311 A1* | 5/2019 | Lee | H10K 77/111 |
| 2019/0227361 A1* | 7/2019 | Yueh | G02F 1/1345 |

FOREIGN PATENT DOCUMENTS

| | | | | |
|---|---|---|---|---|
| CN | 108389884 | | 8/2018 | |
| CN | 108564885 A | * | 9/2018 | G06F 3/041 |
| CN | 208141720 | | 11/2018 | |
| CN | 109345959 | | 2/2019 | |
| CN | 109377887 A | * | 2/2019 | |
| CN | 109411525 | | 3/2019 | |
| CN | 208674093 | | 3/2019 | |
| CN | 110058647 | | 7/2019 | |
| CN | 110058647 A | * | 7/2019 | G06F 1/1652 |
| CN | 110518039 | | 11/2019 | |
| CN | 110610969 | | 12/2019 | |
| CN | 110649070 | | 1/2020 | |
| CN | 110649087 | | 1/2020 | |
| CN | 110649087 A | * | 1/2020 | G09F 9/301 |
| CN | 110992828 | | 4/2020 | |
| KR | 10-2019-0028248 | | 3/2019 | |

* cited by examiner

DISPLAY PANEL AND FLEXIBLE DISPLAY DEVICE

RELATED APPLICATIONS

This application is a National Phase of PCT Patent Application No. PCT/CN2020/092480 having International filing date of May 27, 2020, which claims the benefit of priority of Chinese Patent Application No. 202010254019.4 filed on Apr. 2, 2020. The contents of the above applications are all incorporated by reference as if fully set forth herein in their entirety.

FIELD AND BACKGROUND OF THE INVENTION

The present disclosure relates to the field of display technology, and more particularly, to a display panel and a flexible display device.

With the rapid development of display technology, both display quality and function of display panels have made a breakthrough.

The flexible display device has been widely applied to various fields due to its excellent flexibility and bendability. Compared with traditional screens, the advantages of flexible screens are more obvious. For a flexible display device, to achieve its flexible folding function, the screen itself must have better bending ability and flat performance. Moreover, in order to ensure the folding performance of the entire device, the folding performance of other components matching the screen should also be good. However, conventional flexible display device generally comprises a plurality of supporting backplanes and adhesive layers, making the thickness thicker. The flexible display device with great thickness is not only inconvenient to carry, but also adversely affects the bending of the flexible device. When folding or bending, the dislocation of the glue layers between each of the film layers of the screen is not consistent with the dislocation of each of the film layers, and the tearing problem between the glue layer and the film layer is likely to occur, which may damage the screen and affect the display effect. Moreover, due to the great thickness of the flexible display device, the rigidity and strength of some film layers are too high. When the device is bent to form a water drop-shaped structure, the stress concentrated at the transition point of the water drop is not conducive to enhance the overall performance of the flexible display device.

Therefore, it is necessary to provide solutions to the problems in the conventional technology.

In summary, the conventional flexible display device with great thickness is inconvenient to carry and use. Moreover, when the device is bent or folded, the layers between each of the film layers are easily torn, and the screen is damaged. Further, the high rigidity and strength of each film layer of the device are not conducive to enhance the overall performance of the flexible display device.

SUMMARY OF THE INVENTION

In order to solve the problems described above, the present disclosure provides a display panel and a flexible display device to solve the problems of the conventional flexible display device, which is thick, not portable and not easily used. Moreover, the present disclosure solves the tearing problem of the layers between each of the film layers, and the damage problem of the screen when the device is bent or folded. Moreover, the present disclosure solves the problem that is not conducive to the enhancement of the overall performance of flexible display device due to the higher rigidity and strength of each film layer of the device.

To solve the technical problems described above, the technical solutions provided by the embodiments of the present disclosure are shown as follows.

According to one aspect of the embodiment of the present disclosure, the present disclosure provides a display panel, comprising:

a substrate;
a first adhesive layer disposed on the substrate;
a display layer disposed on the first adhesive layer;
wherein the display layer comprises an array layer and a light-emitting device layer disposed on the array layer, the substrate is directly adhered to the array layer through the first adhesive layer, the substrate is used to support the display layer, and the substrate comprises a plurality of grid structures arranged discontinuously; and
wherein two lateral sides of the substrate comprise a plurality of openings arranged at equal intervals, and each of the plurality of the grid structures is filled with an elastic material.

According to one embodiment of the present disclosure, the substrate comprises at least one of a bending area, a straight area, and a connection area, and the bending area is connected to the straight area through the connection area. The substrate further comprises a first grid structure and a second grid structure. The first grid structure is disposed on the bending area of the substrate, and the second grid structure is disposed on connection area of the substrate.

According to one embodiment of the present disclosure, a shape of the first grid structure is the same as a shape of the second grid structure.

According to one embodiment of the present disclosure, a radial length of the first grid structure is greater than a radial length of the second grid structure.

According to one embodiment of the present disclosure, a shape of each of the plurality of grid structures comprises a strip shape, a circular shape, an elliptical shape, or a wave shape. The plurality of grid structures are arranged in an array manner.

According to the second aspect of the embodiment of the present disclosure, the present disclosure provides a display panel, comprising:

a substrate;
a first adhesive layer disposed on the substrate;
a display layer disposed on the first adhesive layer;
wherein, the display layer comprises an array layer and a light-emitting device layer disposed on the array layer. The substrate is directly adhered to the array layer through the first adhesive layer. The substrate is used to support the display layer. The substrate comprises a plurality of grid structures discontinuously arranged.

According to one embodiment of the present disclosure, the substrate comprises at least one of a bending area, a straight area, and a connection area, and the bending area is connected to the straight area through the connection area.

According to one embodiment of the present disclosure, the substrate further comprises a first grid structure and a second grid structure. The first grid structure is disposed on the bending area of the substrate, and the second grid structure is disposed on connection area of the substrate.

According to one embodiment of the present disclosure, a shape of the first grid structure is the same as a shape of the second grid structure.

According to one embodiment of the present disclosure, a density of the first grid structure is greater than a density of the second grid structure.

According to one embodiment of the present disclosure, a radial length of the first grid structure is greater than a radial length of the second grid structure.

According to one embodiment of the present disclosure, a density of the plurality of the grid structures in the connection area gradually decreases along the bending area toward the straight area.

According to one embodiment of the present disclosure, each of the plurality of the grid structures penetrates the substrate.

According to one embodiment of the present disclosure, two lateral sides of the substrate comprise a plurality of openings arranged at equal intervals.

According to one embodiment of the present disclosure, a shape of each of the plurality of grid structures comprises a strip shape, a circular shape, an elliptical shape, or a wave shape. The plurality of grid structures are arranged in an array manner.

According to one embodiment of the present disclosure, at least one edge of the grid structure in the length direction is an arc shape.

According to one embodiment of the present disclosure, the display layer further comprises a touch layer and a polarizer. The touch layer is disposed on the light-emitting device layer, and the polarizer is disposed on the touch layer.

According to one embodiment of the present disclosure, the display panel further comprises an elastic layer. The elastic layer is disposed in the same layer as the substrate, and the elastic layer fills each of the plurality of grid structures.

According to one embodiment of the present disclosure, a material of the elastic layer comprises silicone resin, metal material or amorphous material.

According to the third aspect of the embodiment of the present disclosure, the present disclosure further provides a flexible display device, comprising:
 a substrate, wherein the substrate comprises at least one of a bending area, a straight area, and a connection area, and the bending area is connected to the straight area through the connection area;
 a first adhesive layer disposed on the substrate;
 a display layer disposed on the first adhesive layer; and
 a protective layer disposed on the display layer;
 wherein the display layer comprises an array layer and a light-emitting device layer disposed on the array layer. The substrate is directly adhered to the array layer through the first adhesive layer. The bending area and the connection area of the substrate comprise a plurality of grid structures discontinuously arranged. When bending, the grid structures corresponding to the bending area and the connecting area are deformed to bend the flexible display device.

In summary, the beneficial effect of the embodiments of the present disclosure are shown as follows.

The present disclosure provides a display panel and a flexible display device. The substrate of the display panel in the embodiments of the present disclosure is arranged into a bending area, a straight area, and a connection area. Moreover, a plurality of discontinuous grid structures are disposed on the substrate corresponding to the bending area and the connection area. When the display panel is bent or folded, the grid structures may be stretched or compressed due to the grid structures disposed on the bending area and the connection area, so that the panel is completely advanced. Furthermore, the display panel of the embodiments of the present disclosure does not require a backplane layer and a pressure-sensitive adhesive layer, resulting in a light and thin overall structure of the panel. The panel may be easily and conveniently carried when bent and provides excellent overall performance.

DETAILED DESCRIPTION OF PREFERRED
SPECIFIC EMBODIMENTS OF THE
INVENTION

The descriptions of the following embodiments refer to the attached drawings and illustrate specific embodiments that can be implemented by the present disclosure.

The flexible display device may be bent or folded during use to achieve the requirements of diverse function of the flexible display device. The bending or folding performance of the flexible display device is related to various factors, such as the thickness of the display device. The conventional flexible display device is generally thick. When the device is folded or bent, the dislocations between the film layers are not consistent, resulting in many problems, which are not conducive to enhance the overall performance of the display device.

In an embodiment of the present disclosure, a display panel and a flexible display device are provided.

Figure 1:
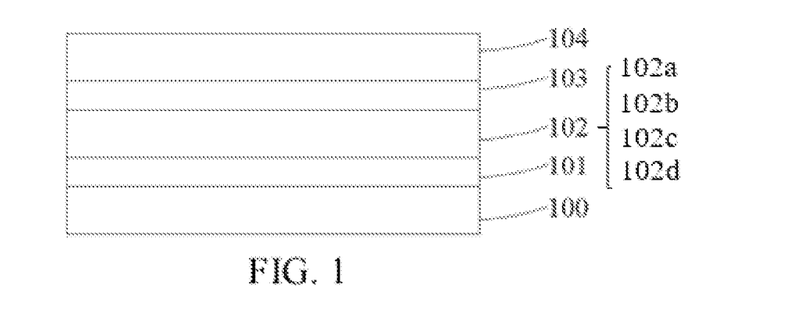
FIG. 1 is a schematic view of each layer of the display panel according to one embodiment of the present disclosure.

As shown in FIG. 1, FIG. 1 is a schematic diagram of each layer of the display panel according to one embodiment of the present disclosure. The display panel comprises a substrate 100, a first adhesive layer 101, a display layer 102, a second adhesive layer 103, and a protective layer 104. The first adhesive layer 101 is disposed on the substrate 100, the display layer 102 is disposed on the substrate 100, the display layer 102 is adhered to the substrate 100 through the first adhesive layer 101, and the second adhesive layer 103 is disposed on the display layer 102. The protective layer 104 is disposed on the display layer 102, and the protective layer 104 is adhered to the display layer 102 through the second adhesive layer 103.

Specifically, the first adhesive layer 101 and the second adhesive layer 102 may be adhesive layers commonly used in manufacturing the display panels, such as optically clear adhesives (OCA), and the capacitive type OCA or resistive type OCA may be selected according to various requirements of different display panels.

After curing and stabilizing the OCA, both the substrate 100 and the display layer 102 are tightly adhered to the first adhesive layer 101, and the display layer 102 and the protective layer 104 are tightly adhered to the second adhesive layer 103. When the display panel bends or folds, the first adhesive layer 101 and the second adhesive layer 103 are shifted consistently with other film layers to ensure desirable bending or folding performance of the panel, and effectively prevent the adhesive layer from being misaligned and torn. The materials of the first adhesive layer 101 and the second adhesive layer 103 may be the same.

The display layer 102 is a normal display function layer of the display panel. When preparing the display layer 102, the display layer 102 may be disposed according to a conventional manufacturing process and a conventional film layer. The display layer 102 provides a display screen of the screen and ensures the normal light-emitting display of the panel.

Specifically, the display layer 102 comprises an array layer 102a and a light-emitting device layer 102b. The light emitting device layer 102b is disposed on the array layer 102a. In the embodiment of the present disclosure, the array layer 102a of the display layer 102 is directly formed on the substrate 100, and the array layer 102a is directly adhered to the substrate 100 through the first adhesive layer 101. That is, no any other film layer, such as a backplane layer, is disposed between the substrate 100 and the array layer 102a. The display layer 102 is directly supported by the substrate 100, thereby reducing the film structure of the flexible display device and making the flexible display device lighter and thinner. Moreover, the substrate 100 may be a supporting layer, which is used to support the display layer 102 and other film layers thereon.

Further, the light-emitting device layer 102b further comprises film layer structures, such as an anode layer, a light-emitting layer, and a cathode layer. These film layer structures may be disposed on the array layer according to the process of a conventional display panel, which is not described in detail any more.

The display layer 102 may further comprise a touch layer 102c and a polarizer 102d. The touch layer 102c is disposed on the light-emitting device layer 102b, and the polarizer 102d is disposed on the touch layer 102c, to achieve the display and touch functions of the display panel.

Further, the substrate 100 disclosed in the embodiment of the present disclosure is directly adhered to the display layer 102 through the first adhesive layer 101. The backplane layer and the pressure-sensitive adhesive layer adhered to the backplane layer are no longer disposed. Therefore, the overall thickness of the display panel is effectively reduced, allowing the display panel to become thinner, and the bending performance is improved when the device is bent or folded.

The display panel in the embodiment of the present disclosure removes the backplane layer and the pressure-sensitive adhesive layer. When bending, the influence of the backplane layer and the pressure-sensitive adhesive layer on the panel is correspondingly reduced, and the tearing problem of the film layers is effectively improved.

Figure 2:
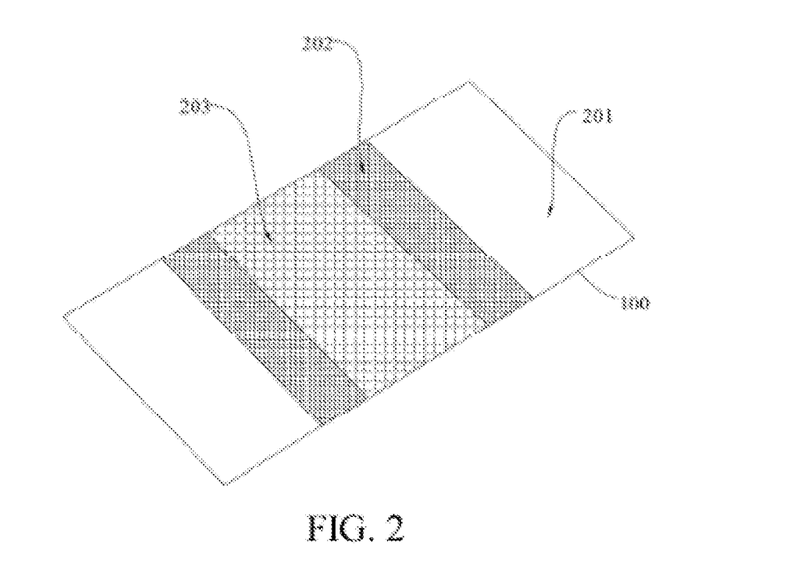
FIG. 2 is a schematic plan view of the substrate according to one embodiment of the present disclosure.

As shown in FIG. 2, FIG. 2 is a schematic plan view of the substrate according to one embodiment of the present disclosure. In order to reduce the thickness of the display panel, enhance the bending or folding performance of the panel, and meanwhile enhance the overall performance of the panel, the substrate 100 of the embodiment of the present disclosure comprises a straight area 201, a connection area 202, and a bending are 203. The straight area 201 is connected to the bending area 203 through the connection area 202. The substrate 100 may comprise a plurality of different areas described above.

Since the substrate 100 is generally a steel plate or a hard material, when the panel is bent or folded, the preferred bending state of the bending portion is a water drop shape or a water drop-like shape. Under this state, the stress level and bending performance of the bending portion of the panel are good. Therefore, when the structure of each film layer and the structure of the substrate of the panel is designed, it is ensured that the shape of the bending portion forms a drop shape or a water drop-like shape after bending.

Specifically, the substrate 100 of the embodiment of the present disclosure bends as the display panel bends. The connection area 202 and the bending area 203 are bent. The connection area 202 mainly has a transitional function. After bending, the connection area 202 and the bending area 203 form a water drop shape, and the stress concentrated in the connection area 202 is obvious, especially the stress near the bending area 203 is greatest.

In the embodiment of the present disclosure, the connection areas 202 are symmetrically distributed with respect to the bending areas 203, and are connected to two lateral sides of the straight area 201.

In order to ensure the bending effect, the substrate 100 of the embodiment of the present disclosure comprises a plurality of grid structures arranged discontinuously. A first grid structure is disposed on the bending area 203, and a second grid structure is disposed on the connection area 202. The grid structures make the bending of the substrate easier and enhance the flexibility of the substrate.

Figure 3A:
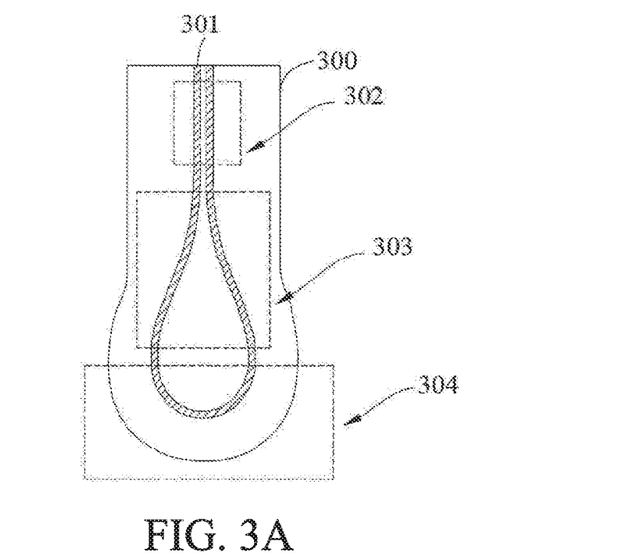
FIG. 3A is a schematic bending view of the display panel according to one embodiment of the present disclosure.

As shown in FIG. 3A, FIG. 3A is a schematic bending view of the display panel according to one embodiment of the present disclosure. The display panel 300 comprises a substrate 301 and other film layers connected to the substrate 301. The structures of the other film layers are shown in FIG. 1 and would not be described in detail herein. After bending, the straight area 302 of the substrate 301 remains straight, the bending area 304 is deformed the most, and the connection area 303 is deformed to a certain extent. Meanwhile, when the bending area 304 and the connecting area 303 form a water drop shape or a water drop-like shape, the bending effect of the display panel 300 is the best.

Specifically, the shape of the first grid structure and the shape of the second grid structure may be the same or different. In the embodiments of the present disclosure, the first grid structure and the second grid structure with the same shape are used as an example for description.

Figure 3B:
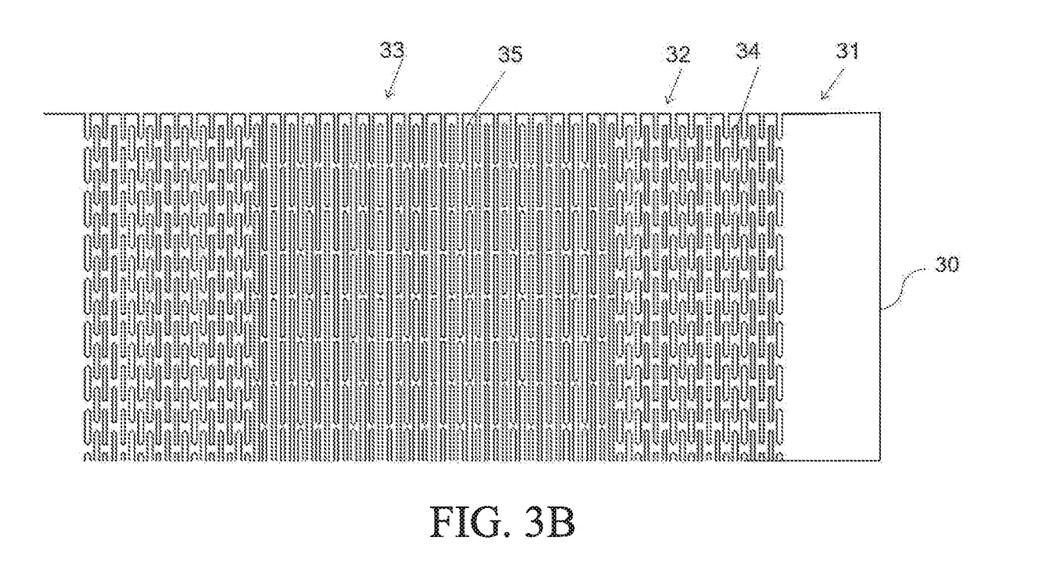
FIG. 3B is a schematic view of the substrate according to one embodiment of the present disclosure.

As shown in FIG. 3B, FIG. 3B is a schematic view of the substrate according to one embodiment of the present disclosure. The substrate 30 comprises a straight area 31, a connection area 32, and a bending area 33. The straight area 31 is connected to the bending area 33 through the connection area 32, and a first grid structure 35 is disposed on the bending area 33, and a second grid structure 34 is disposed on the connection area 32. No any grid structure is disposed on the substrate 100 corresponding to the straight area 31. The shape and disposed manner of the first grid structure 35 and the second grid structure may be the same or different, and specifically, are disposed according to actual products. When the substrate 100 is bent, the deformation area mainly occurs in the connection area 32 and the bending area 33. The first grid structure 35 and the second grid structure 34 in the area are deformed. For example, the grid structure is elongated or compressed, so that the substrate 100 is more easily bent.

Figure 4:
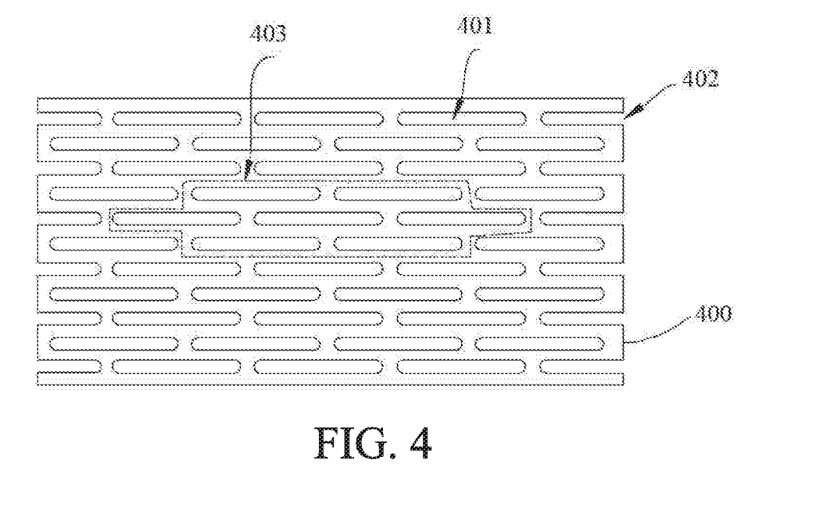
FIG. 4 is a schematic view of the grid structures in the bending area of the substrate according to one embodiment of the present disclosure.

As shown in FIG. 4, FIG. 4 is a schematic view of the grid structures in the bending area of the substrate according to one embodiment of the present disclosure. A plurality of the first grids 401 are discontinuously formed on the hollow substrate 400. The plurality of the first grids 401 may be arranged in a regular array. For example, the length and width of the substrate in the bending area are disposed at equal intervals. The shape, structure and size of each of the first grids 401 may be disposed to be the same or different. In the present embodiment, in order to simplify the manufacturing process, each of the first grids 401 is disposed the same.

Meanwhile, in order to enhance the bending performance of the substrate 400, when the first grid 401 is hollowed out, the length direction of the first grid 401 is parallel to the bending direction.

When the bending area is bent, since the first grid 401 is disposed on the bending area of the substrate 400, little physical connection material is disposed between the grids, thereby increasing the flexibility of the substrate 400. When the force applied the substrate 400 is the same as the force applied to a conventional substrate, the substrate 400 may be bent easily, and the bending degree of the substrate 400 is great. For example, when the stretching area 403 is subjected to a bending stretching stress, the grid structures in the stretching area 403 may be deformed in both of the length or width directions, and adjacent grids are connected by the substrate 400. As the first grid is dense, little physical material is disposed between the connected grids, and it is easier to bend and deform without breaking. Thereby, the bending performance of the substrate 400 is enhanced, and the bending or folding performance of the display panel is enhanced.

Specifically, for two rows of first grids 401 adjacent to each other on the substrate 400, the openings 402 are further disposed on both lateral sides of the substrate 400. The opening 402 is part of the first grid 401. The distance between adjacent openings 402 is the same, and the openings 402 make the substrate 400 more flexible.

The width of the opening 402 may be the same as the width of the first grid 401 or greater than the width of the first grid 401.

Figure 5:
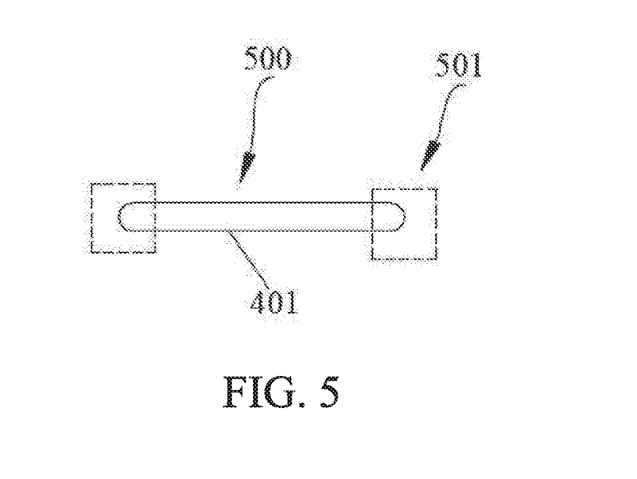
FIG. 5 is a schematic view of the first grid structure according to one embodiment of the present disclosure.

As shown in FIG. 5, FIG. 5 is a schematic view of the first grid structure according to one embodiment of the present disclosure. The first grid 401 comprises a first area 500 and a second area 501, the length of the first area 500 is greater than the length of the second area 501, and the length direction of the first area 500 is close to or parallel to the bending direction of the substrate. The second area 501 may be symmetrically disposed along the first area 500. Moreover, in the second area 501, the edge of the second area 501 is configured in an arc shape, such as a circular arc. When stretching, the edge with an arc shape easily deforms in the stretching direction, thereby enhancing the bending performance of the display panel.

Further, the first grid 401 may also be configured in a strip shape, a circular shape, an elliptical shape, or a wave shape. When the substrate is bent, the shape described above deforms with the bending of the panel, thereby increasing the bending performance of the substrate.

Figure 6:
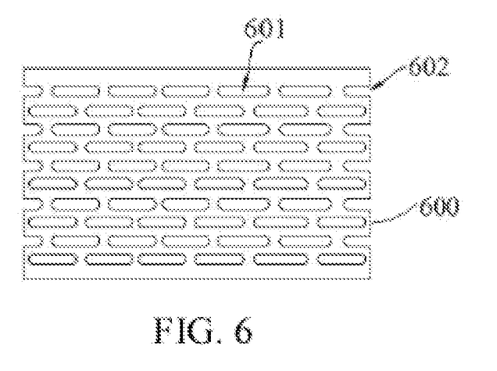
FIG. 6 is a schematic view of the grid structures in the connection area of the substrate according to one embodiment of the present disclosure.

As shown in FIG. 6, FIG. 6 is a schematic view of the grid structures in the connection area of the substrate according to one embodiment of the present disclosure. The substrate 600 is a substrate in the connection area. The substrate 600 comprises a plurality of second grids 601 and a plurality of second openings 602. The second grids 601 are disposed discontinuously on the substrate 600, the second openings 602 are defined by both lateral sides of the substrate 600, and the second openings 602 are defined at equal intervals. The second grids 601 may be arranged on the substrate 600 in an array. The shape, structure and size of each of the second grids 601 may be the same or different. In the embodiment of the present disclosure, each of the second grids 601 with the same shape is used as an example for description.

With reference to the first grid structure in the bending area in FIG. 4, the shape of the first grid 401 and the shape of the second grid 601 may be the same, and the specific arrangement of the second grid 601 may be the same as the specific arrangement of the first grid 401. Since the deformation of the substrate in the connection area is smaller than the deformation of the substrate in the bending area, the length of the second grid 601 may be smaller than the length of the first grid 401 in the length direction. Moreover, the density of the first grid 401 is greater than the density of the second grid 601.

Figure 7:
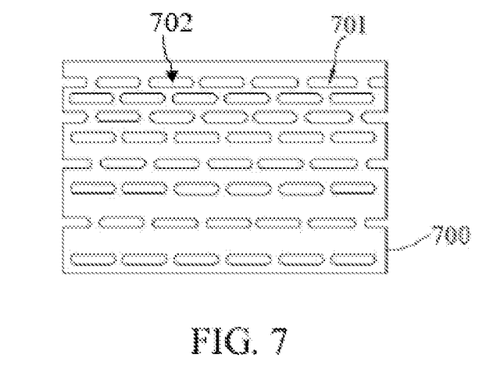
FIG. 7 is a schematic diagram of the grid structures in the connection area of the substrate in another embodiment of the present disclosure.

Further, as shown in FIG. 7, FIG. 7 is a schematic diagram of a grid structure in a substrate connection area according to yet another embodiment of the present disclosure. In the embodiment of the present disclosure, the density of the second grid 701 in different areas of the substrate 700 is different. Since the closer to the bending area, the greater deformation as bending. When the second grid 701 is disposed, the density of the grid gradually decreases from the bending area to the straight area, to effectively comply with the bending of the display panel.

Preferably, in the embodiment of the present disclosure, the grid structure may further be filled with an elastic material to form an elastic layer 702 in the entire grid area. When the grid is deformed and restored to its original shape, the elastic layer 702 may allow the grid to restore quickly, thereby enhancing the recovery performance of bending of the display panel. Since the elastic layer is disposed within the grid, the formed elastic layer 702 is in the same layer structure as the substrate. The material of the elastic layer 702 may comprise silicone resin, metal material, or amorphous material. Further, when the elastic layer 702 is disposed, the elastic layer 102*e* may also be disposed on the entire surface of the substrate and the elastic layer 102*e* fills the grid area to form an elastic layer 702 on the surface of the substrate. When the substrate is restored after bending, the elastic layer 702 allows the substrate easier to be restored.

Moreover, the embodiment of the present disclosure also provides a flexible display device. The flexible display device comprises the display panel of the embodiment of the present disclosure. The film layers of the flexible display device of the embodiment of the present disclosure are reduced, and the thickness of the flexible display device is thinner. When the flexible display device is bent or folded, the flexible display device exhibits desirable overall performance.

The display panel and the flexible display device provided by the embodiments of the present disclosure have been described in detail above. The descriptions of the above embodiments are only used to help understand the technical solutions and core concept of the present disclosure. A person ordinarily skilled in the art should understand that the technical solutions described in the foregoing embodiments may be modified, and these modifications or replacements do not deviate the essence of the corresponding technical solutions from the scope of the technical solutions of the embodiments of the present disclosure.

What is claimed is:

1. A display panel, comprising:
   a substrate;
   a first adhesive layer disposed on the substrate;
   a display layer disposed on the first adhesive layer;
   wherein the display layer comprises an array layer and a light-emitting device layer disposed on the array layer, the substrate is directly adhered to the array layer through the first adhesive layer, the substrate is used to support the display layer, and the substrate comprises a plurality of grid structures arranged discontinuously; and
   wherein two lateral sides of the substrate comprise a plurality of openings arranged at equal intervals, and each of the plurality of the grid structures is filled with an elastic material,
   wherein the substrate comprises at least one bending area, straight area, and connection area, and the bending area is connected to the straight area through the connection area,
   and wherein the substrate further comprises a first grid structure and a second grid structure, the first grid structure is disposed on the bending area of the substrate, and the second grid structure is disposed on connection area of the substrate.

2. The display panel according to claim 1, wherein a shape of the first grid structure is the same as a shape of the second grid structure.

3. The display panel according to claim 2, wherein a radial length of the first grid structure is greater than a radial length of the second grid structure.

4. The display panel according to claim 1, wherein a shape of each of the plurality of grid structures comprises a strip shape, a circular shape, an elliptical shape, or a wave shape, and the plurality of grid structures are arranged in an array manner.

5. A display panel, comprising:
   a substrate;
   a first adhesive layer disposed on the substrate;
   a display layer disposed on the first adhesive layer;
   wherein, the display layer comprises an array layer and a light-emitting device layer disposed on the array layer, the substrate is directly adhered to the array layer through the first adhesive layer, the substrate is used to support the display layer, and the substrate comprises a plurality of grid structures discontinuously arranged,
   wherein the substrate comprises at least one bending area, straight area, and connection area, and the bending area is connected to the straight area through the connection area,
   and wherein the substrate further comprises a first grid structure and a second grid structure, the first grid structure is disposed on the bending area of the substrate, and the second grid structure is disposed on connection area of the substrate.

6. The display panel according to claim 5, wherein a shape of the first grid structure is the same as a shape of the second grid structure.

7. The display panel according to claim 5, wherein a density of the first grid structure is greater than a density of the second grid structure.

8. The display panel according to claim 5, wherein a radial length of the first grid structure is greater than a radial length of the second grid structure.

9. The display panel according to claim 5, wherein a density of the plurality of the grid structures in the connection area gradually decreases along the bending area toward the straight area.

10. The display panel according to claim 5, wherein each of the plurality of the grid structures penetrates the substrate.

11. The display panel according to claim 5, wherein two lateral sides of the substrate comprise a plurality of openings arranged at equal intervals.

12. The display panel according to claim 5, wherein a shape of each of the plurality of grid structures comprises a strip shape, a circular shape, an elliptical shape, or a wave shape, and the plurality of grid structures are arranged in an array manner.

13. The display panel according to claim 12, wherein at least one edge of the grid structure in a length direction is an arc shape.

14. The display panel according to claim 5, wherein the display layer further comprises a touch layer and a polarizer, the touch layer is disposed on the light-emitting device layer, and the polarizer is disposed on the touch layer.

15. The display panel according to claim 5, wherein the display panel further comprises an elastic layer, the elastic layer is disposed in the same layer as the substrate, and the elastic layer fills each of the plurality of grid structures.

16. The display panel according to claim 15, wherein a material of the elastic layer comprises silicone resin, metal material or amorphous material.

17. A flexible display device, comprising:
    a substrate, wherein the substrate comprises at least one bending area, a straight area, and a connection area, and the bending area is connected to the straight area through the connection area;
    a first adhesive layer disposed on the substrate;
    a display layer disposed on the first adhesive layer; and
    a protective layer disposed on the display layer;
    wherein the display layer comprises an array layer and a light-emitting device layer disposed on the array layer, the substrate is directly adhered to the array layer through the first adhesive layer, and the bending area and the connection area of the substrate comprise a plurality of grid structures discontinuously arranged, and wherein as bending, the grid structures corresponding to the bending area and the connecting area are deformed to bend the flexible display device,
    wherein the substrate further comprises a first grid structure and a second grid structure, the first grid structure is disposed on the bending area of the substrate, and the second grid structure is disposed on connection area of the substrate.

* * * * *